No. 818,402. PATENTED APR. 24, 1906.
D. APSTEIN.
PNEUMATIC TIRE PLUG.
APPLICATION FILED JUNE 24, 1905.

Witnesses
R. H. Newman
Ruth Raymond

Inventor
David Apstein
By
Chamberlain & Newman
Attorneys

UNITED STATES PATENT OFFICE.

DAVID APSTEIN, OF BRIDGEPORT, CONNECTICUT.

PNEUMATIC-TIRE PLUG.

No. 818,402.  Specification of Letters Patent.  Patented April 24, 1906.

Application filed June 24, 1905. Serial No. 266,863.

*To all whom it may concern:*

Be it known that I, DAVID APSTEIN, a citizen of the United States, and a resident of Bridgeport, in the county of Fairfield and State of Connecticut, have invented certain new and useful Improvements in Pneumatic-Tire Plugs, of which the following is a specification.

My invention relates to plugs for pneumatic bicycle-tires, and especially to that class known as "metal" plugs, commonly made of brass and used to close a tire-puncture.

It is the object of my invention to improve upon plugs for pneumatic tires by providing a device which will not injure or cut the tire when in use, as is now the case with some plugs upon the market; to provide a plug which in itself contains means for producing an opening in the tire sufficient to permit the plug to be inserted; further, to form the head of the plug itself of such a shape as to insure its free passage through the hole of the tire; finally, to further shape said head to conform to the shape of the tire, thus causing it to press evenly against the same at all points.

Upon the accompanying drawings, forming a part of this specification, similar characters of reference denote like or corresponding parts throughout the several figures, and of which—

Figure 1:
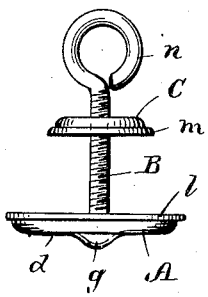
Figure 2:
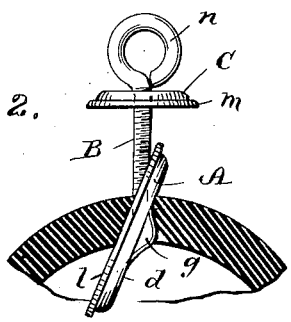
Figure 3:
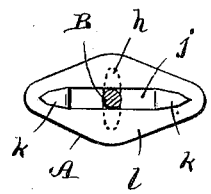
Figure 4:
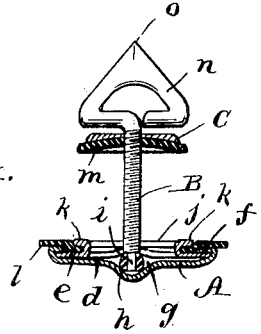
Figure 6:
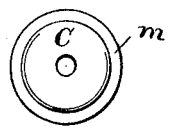
Figure 7:
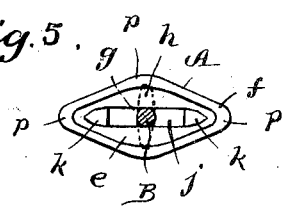
Figure 5:
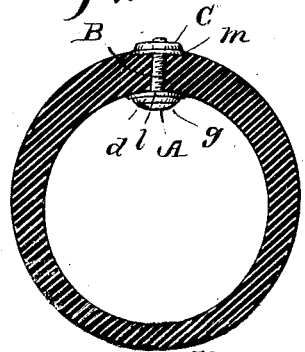

Figure 1 shows a side elevation of my improved plug complete. Fig. 2 shows a further side elevation of my plug, together with a portion of a pneumatic tire, said plug being partially inserted in said tire. Fig. 3 is a sectional plan view showing the under side of the head of the plug. Fig. 4 is a longitudinal sectional elevation through the plug. Fig. 5 is a further sectional plan view of the under side of the head similar to Fig. 3, but having the flexible washer removed. Fig. 6 is a detached plan view of the nut belonging upon the shank of the plug. Fig. 7 is a cross-sectional view of a pneumatic tire and with my improved plug attached thereto as in use.

Referring in detail to the characters of reference marked upon the drawings, A indicates the head of the plug, which, as shown, is of substantially diamond shape. It is pivotally attached to a threaded shank B, which shank in turn is provided with a nut C to be clamped against the outside of the tire. The head A of the plug is preferably formed of two sheet-metal parts $d$ and $e$, the former representing the outside and the latter the inside, the two being fastened together at their edges by the said outside member having its edges turned in over the edge of the inner member $e$ and forming an annular bead $f$, which is slightly broader at the corners $p$ to better avoid wear. A transverse enlarged socket $g$ is formed central of the head to receive a rocker-pin $h$ and in a central hole of which the reduced end $i$ of the threaded shank B is rotatably mounted. A longitudinal slot $j$ is formed through the inner section $e$ of the head to allow the shank B to swing forward or back. The stock displaced from said slot is deflected outward to form engaging hooks $k$ to secure a flexible washer $l$ to the under side of the said head, as is clearly shown in the drawings. This washer is formed of rubber, leather, or other soft material and being placed against the under side of the head serves to engage the inner surface of the tire when the head is shoved through the tire and set back against the inside. This washer prevents the edge of the head from unduly wearing or cutting the tire, as is the case with some forms of metal plugs. The pin $h$, mounted in the socket $f$ of the head, is free to turn or rock therein with the swinging movement of the shank, and consequently allows either end of the said head to be folded back against the shank and with the other end extended, as shown in Fig. 2. In this manner the head of the plug is inserted through the puncture or opening of the tire and is then swung back or adjusted to substantially a right angle to the shank and clamped by the nut C. In practice this nut is run down on the shank against the face of the tire, whereupon the said shank is turned to further draw the nut in against the tire. After said nut is forced up to form an airtight closure said threaded shank is bent over and broken off even with the face of the said nut. The nut, like the head, is provided with a rubber or other flexible washer $m$, which may be cemented thereto. This washer protects the surface of the tire from wear or cutting by the edge of the nut, as is the case with the washer under the head.

For convenience of manipulation I provide a head $n$ of the wire stock of the shank, which head is preferably of a triangle shape, having a sharpened end $o$, which can also be used for forming an entry for the head of the plug.

As seen in Fig. 7, the under side of the head of the plug is slightly convexed to better conform to the shape of the tire and to insure its edge bearing equally on the washer which is secured uniformly against the inside of the tire at all points.

Having thus described my invention, what I claim, and desire to secure by Letters Patent, is—

1. A pneumatic-tire plug, comprising a head having a transverse recess therein, a transverse rocker-pin mounted in the recess, a threaded shank rotatably mounted in said transverse pin, and a nut mounted upon said shank.

2. A pneumatic-tire plug, comprising a head having a transverse pocket therein, a rocker-pin mounted in the pocket, a threaded shank pivotally mounted in the pin, a nut mounted on the shank, and a flexible washer secured to the under side of the head.

3. A pneumatic-tire plug, comprising a head having a transverse pocket therein, a rocker-pin mounted in the pocket, an annular rib formed on the under side of said head, a flexible washer to engage the rib, hooks to secure the washer in place, a threaded shank pivotally connected to the transverse pin mounted in the socket of the head, and a nut adjustably mounted upon the shank substantially as described.

4. A pneumatic-tire plug, comprising a head having hooks upon its under side, a flexible washer attached to said hooks, a threaded shank pivoted to the head, a nut upon the shank, and a flexible washer attached to the nut.

5. A pneumatic-tire plug comprising a head having a transverse recess therein, a transverse rocker-pin mounted in the recess, a threaded shank rotatably mounted in said transverse recess, a nut mounted upon said shank, and flexible material secured beneath the head and washer.

6. A pneumatic-tire plug, comprising a head convexed on its under side to conform to the normal shape of a tire, a threaded pin swiveled to said head, and a concave washer mounted on the said threaded pin.

Signed at Bridgeport, in the county of Fairfield and State of Connecticut, this 20th day of June, A. D. 1905.

DAVID APSTEIN.

Witnesses:
C. M. NEWMAN,
RUTH RAYMOND.